(12) United States Patent
Kugai

(10) Patent No.: US 6,799,271 B2
(45) Date of Patent: Sep. 28, 2004

(54) METHOD AND SYSTEM FOR AUTHENTICATING USER AND PROVIDING SERVICE

(75) Inventor: Masami Kugai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/419,866

(22) Filed: Apr. 22, 2003

(65) Prior Publication Data

US 2003/0200177 A1 Oct. 23, 2003

(30) Foreign Application Priority Data

Apr. 23, 2002 (JP) ........................................ 2002-121020

(51) Int. Cl.⁷ ............................ H04L 9/00; G06F 11/30
(52) U.S. Cl. ........................ 713/168; 713/171; 713/201; 380/30; 705/51; 705/59; 705/67
(58) Field of Search ................................ 713/171, 201, 713/168; 705/65, 51, 52, 54, 55, 57–59, 64, 67, 71; 380/30

(56) References Cited

U.S. PATENT DOCUMENTS

| | | | | |
|---|---|---|---|---|
| 5,224,163 A | * | 6/1993 | Gasser et al. .................. | 380/30 |
| 5,629,980 A | | 5/1997 | Stefik et al. ................... | 705/54 |
| 5,784,463 A | * | 7/1998 | Chen et al. ................... | 713/171 |
| 6,275,941 B1 | * | 8/2001 | Saito et al. ................... | 713/201 |
| 2002/0099663 A1 | * | 7/2002 | Yoshino et al. ............... | 705/65 |
| 2003/0005327 A1 | * | 1/2003 | Durand et al. ............... | 713/201 |
| 2003/0014631 A1 | * | 1/2003 | Sprague ....................... | 713/168 |
| 2003/0056096 A1 | * | 3/2003 | Albert et al. ................ | 713/168 |

FOREIGN PATENT DOCUMENTS

JP 8-263438 10/1996

OTHER PUBLICATIONS

"Cryptography and Information Security", Tsujii, et al., Shokodo Co., Ltd (1990), pp. 62–65.

* cited by examiner

*Primary Examiner*—Emmanuel L. Moise
(74) *Attorney, Agent, or Firm*—Fitzpatrick, Cella, Harper & Scinto

(57) ABSTRACT

A service providing method which uses a user terminal, a service providing apparatus, and an authentication apparatus is disclosed. In the method, authentication data is generated and encrypted by using an encryption key which is stored in the user terminal. The encrypted authentication data is transmitted from the authentication apparatus to the user terminal through the service providing apparatus. The encrypted authentication data is decrypted in the user terminal by using the encryption key. The decrypted authentication data is returned to the authentication apparatus through the service providing apparatus, and an authentication is executed in the authentication apparatus by comparing the decrypted authentication data transmitted from the user terminal with the authentication data before encryption. The service providing apparatus provides a service to the user in accordance with a result of the authentication.

20 Claims, 12 Drawing Sheets

FIG. 3

```
                    TRANSACTION MENU

301 ——— CONTENT ID   : gdoc023655
302 ——— CONTENT NAME : STUDY OF OLD TALE "URASHIMA TARO"

USAGE RIGHT
      ─────────────────────────────────────────────
303 ——— ☐ PRINT    ○ MONOCHROME    ● COLOR
304 ——— ☐ <FEE, RESULT CHARGING SCHEME>
              BASIC FEE                   [ 300]  YEN ——— 309
              PRINT FEE PER PRINT PROCESS [1200]  YEN ——— 310

305 ——— ☐ <FEE, PREPAID SCHEME>
                       NUMBER OF PRINT   PREPAID FEE
                       PROCESSES
306 ———       ☐ A           2            [2000] YEN ——— 311
307 ———       ☐ B          10            [9000] YEN ——— 312
308 ———       [ OTHER ]
      ─────────────────────────────────────────────
      PASSWORD   [               ] ——— 313

[  OK  ]   [ CANCEL ]
                 │            │
                314          315
```

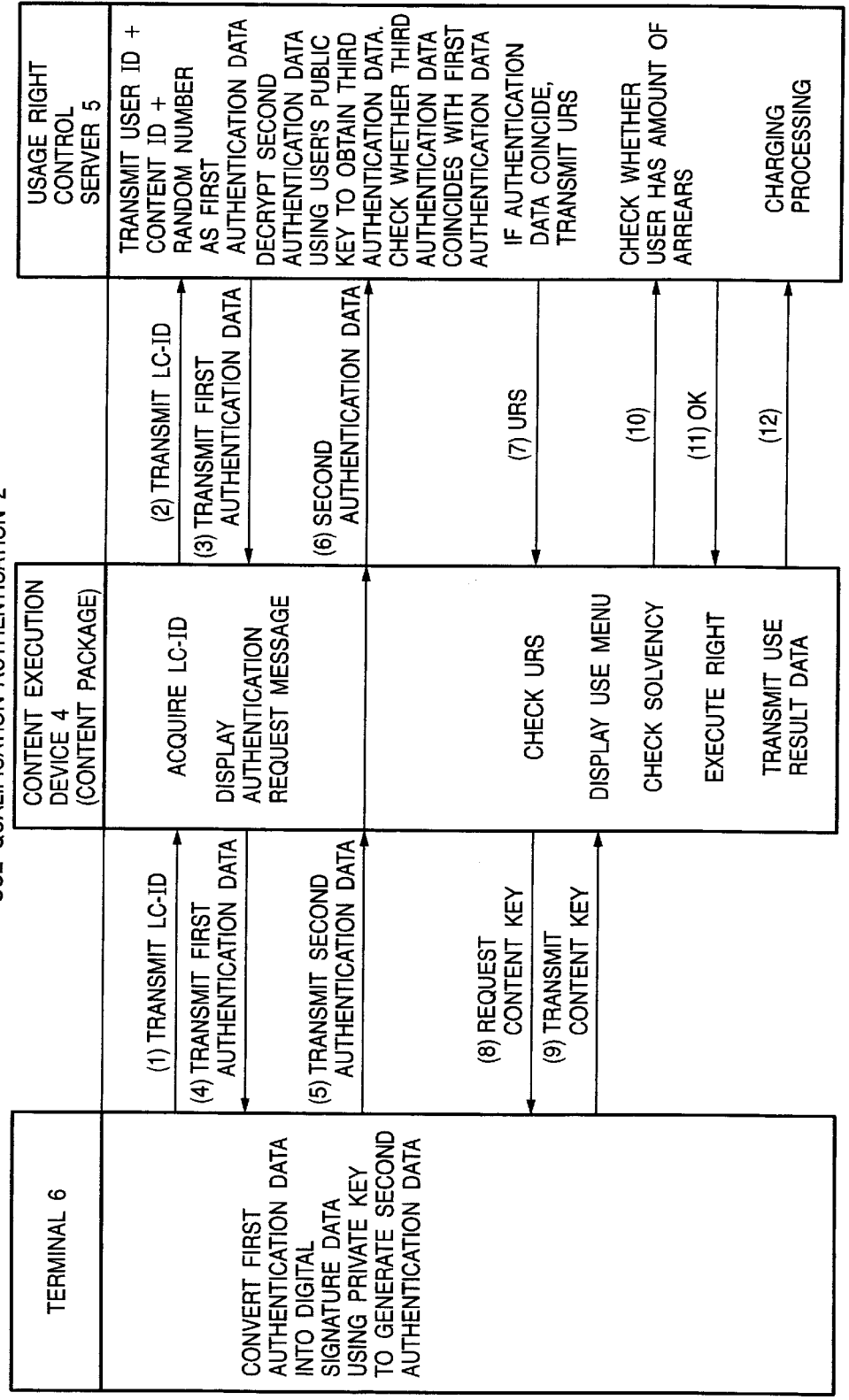

METHOD AND SYSTEM FOR AUTHENTICATING USER AND PROVIDING SERVICE

FIELD OF THE INVENTION

The present invention relates to a method and system for authenticating a user and providing a service.

BACKGROUND OF THE INVENTION

Along with recent popularization of the Internet, sales business which broadcasts digital contents using the network has come into the limelight. However, since copyrights of digital contents are generally not sufficiently protected, illicit use of contents without any compensation for them is posing a problem.

To solve this problem, a copyright protection technique using encryption/authentication, such as MagicGate (copyright protection mechanism) available from Sony Corporation, has been developed. However, it is essential for such a technique to use a special recording medium such as a memory stick having an encryption/authentication function. In addition, the technique cannot take advantage of copy broadcast of digital contents.

In conventional content sales, users pay the prices of contents themselves. This purchase system is inconvenient for the users because the fees to be paid are the same independently of the number of times of use of contents.

U.S. Pat. No. 5,629,980 to US Xerox Corporation and corresponding Japanese Patent Laid-Open No. 8-263438 propose a method of solving the above problems.

According to Japanese Patent Laid-Open No. 8-263438, an appropriate usage right and fee are attached to each digital work and stored in the first repository. The second repository starts a session by the first repository. The second repository requests access to a digital work. The first repository checks the usage right corresponding to the digital work and a permission for access to the digital work. When the access is denied, the first repository ends the session by an error message. When the access is granted, the first repository transfers the digital work to the second repository.

When the digital work is transferred to the second repository, each of the first and second repositories generates bill information to a credit server. In this way, illicit bill processing is prevented by issuing two bill notifications.

In these techniques, free broadcast with copyright protection of digital contents is impeded. U.S. Pat. No. 5,629,980 to US Xerox Corporation and corresponding Japanese Patent Laid-Open No. 8-263438 disclose a method of charging the user for use of a digital content in accordance the contents of use (the number of times of use) and simultaneously protecting the copyright.

In this prior art, however, a user who wants to use a digital content must input an encryption key unique to the user to a content execution device. For example, when a user is going to execute a content package by a content execution device, use qualification authentication processing is performed on the basis of the communication protocol between the content execution device and a usage right control server. Authentication data transmitted from the usage right control server to the content execution device is decrypted using an encryption key that is input by the user to the content execution device. The thus obtained decrypted data is transmitted to the usage right control server. It is determined whether decryption has properly been executed, thereby authenticating the use qualification. At this time, how to maintain the security of the encryption key input to the content execution device is a problem.

Especially, when the content execution device is a device commonly used by many unspecified persons, inputting a user's encryption key to the device poses a problem of security.

SUMMARY OF THE INVENTION

Accordingly, an object of the present invention is to provide a service providing method with high security, information processing system, control program, and storage medium.

According to the present invention, the foregoing object is attained by providing a service providing method which uses a user terminal which stores an encryption key, a service providing apparatus which can communicate with the user terminal, and an authentication apparatus which can communicate with the service providing apparatus, comprising:

an authentication data generation step of generating authentication data and encrypting the generated authentication data using an encryption key;

a transmission step of transmitting the encrypted authentication data from the authentication apparatus to the user terminal through the service providing apparatus;

a decryption step of decrypting the encrypted authentication data in the user terminal using the encryption key stored in the user terminal;

a return step of returning the authentication data decrypted in the decryption step to the authentication apparatus through the service providing apparatus;

an authentication step of executing authentication in the authentication apparatus by comparing the decrypted authentication data transmitted from the user terminal with the authentication data before encryption; and a service providing step of causing the service providing apparatus to provide a service to the user in accordance with an authentication result in the authentication step.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 3 is a view showing an example of a transaction menu window;

FIG. 12 is a view for explaining the protocol of use qualification authentication according to the second embodiment.

DETAILED DESCRIPTION OF THE PREFERRED EMBODIMENTS

Preferred embodiments of the present invention will now be described in detail with reference to the drawings. It should be noted that the relative arrangement of the components, the numerical expressions, numerical values and dialog boxes set forth in these embodiments do not limit the scope of the present invention unless it is specifically stated otherwise.

(First Embodiment)

Figure 1:
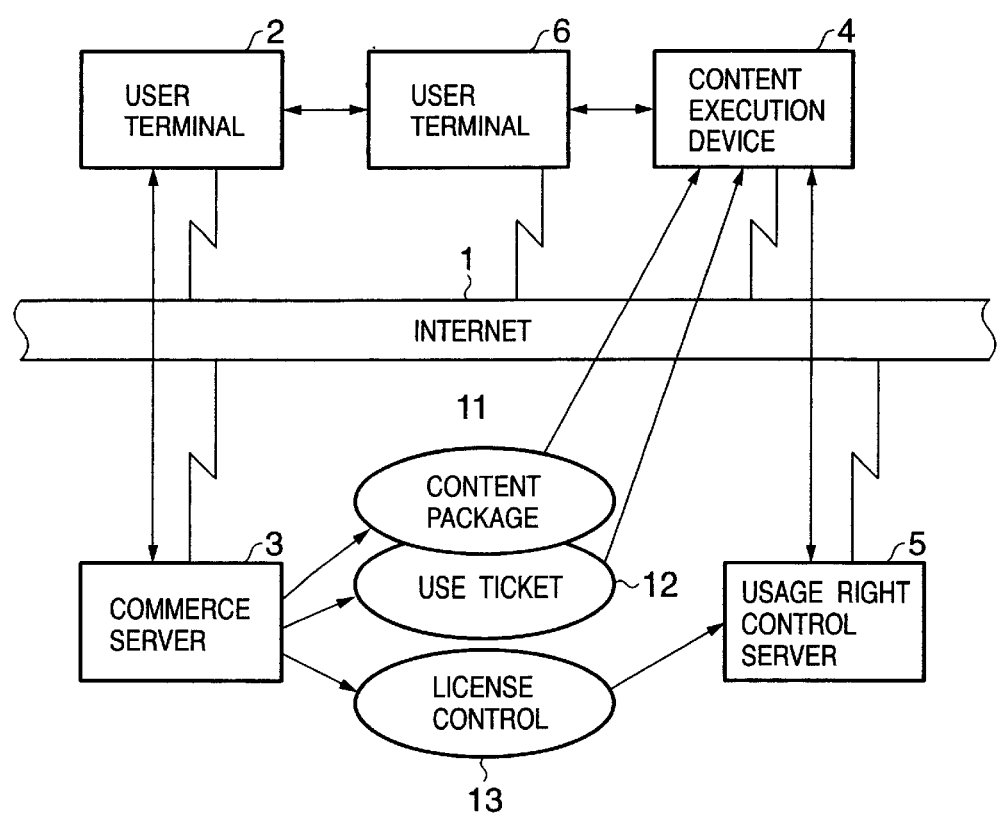
FIG. 1 is a block diagram showing the overall arrangement of a system according to the first embodiment of the present invention.

FIG. 1 is a block diagram showing the overall arrangement of a content broadcast system according to an embodiment of the present invention. This embodiment is a technique for managing a license through the Internet or any other electronic communicate mechanism and is suitably used for copyright protection and service use control when, e.g., digital contents are to be broadcast in the Internet. This technique is also suitably used in a device use management system which manages the usage right of Internet connected devices or charges users for use of the devices. The technique is also suitably used for an arbitrary system which requires centralized authentication.

Referring to FIG. 1, reference numeral 1 denotes a network of the Internet. A client PC (user terminal) 2 used by a user is connected to the Internet 1 by a protocol such as HTTP, FTP, POP3, or SMTP.

A commerce server 3 in which digital contents to be sold are stored is also connected to the Internet 1. A content execution device 4 serves as an output apparatus which provides digital contents stored in the commerce server 3 to the user. The content execution device 4 is a device like a digital copying machine compatible with a network, which downloads a digital content from the commerce server and displays or prints the digital content.

The content execution device 4 connected to the Internet has a function as a Web server. The content execution device 4 also has a display with a resolution of, e.g., 640★480 dots. The content execution device 4 may have, as an operation section, e.g., a touch panel that allows a user to designate a position on the display screen by pointing at that position with a finger or the like as U/I operation, a ten-key pad, or a soft keyboard that allows a user to perform key input by pointing at a keyboard image displayed on the display screen. The content execution device 4 also has software (OS, various kinds of protocols of the Internet, SSL, and WWW browser) necessary for connection to the Internet 1 and Java VM (Java Virtual Machine) environment. The content execution device 4 need not always be a digital copying machine but may be, e.g., a personal computer or workstation.

A usage right control server 5 authenticates a user and places restrictions on content use. The usage right control server 5 is also connected to the Internet 1. The commerce server 3 and usage right control server 5 may be a single server having the functions of both servers.

A portable information terminal 6 such as an IC card or PDA has an interface such as Bluetooth (registered trademark) to communicate with at least the content execution device 4. The terminal 6 also has a tamper resistance.

A content package 11, use ticket 12, and license control 13 indicate data to be processed in the system.

This content broadcast system is a system for members only. Each member is assigned a user ID. In addition, each member (user) has private key data of public key encryption scheme such as RSA and secretly holds the private key data in the terminal 6 belonging to the user.

The usage right control server 5 stores and manages, as a key database, public key data corresponding to the private keys of all members in correspondence with their user IDs.

In the system shown in FIG. 1, the user who wants to purchase a digital content accesses the commerce server 3 on the Internet using the browser and communication function installed in the terminal 2 such as a personal computer or digital complex device. If a desired content is present in the commerce server 3, the user designates the digital content and select desired use conditions (for example, whether the user wants to use a copy or printed matter of the data or only requests display of the data) from use forms permitted by the copyright holder (licenser) of the content.

Upon receiving the input from the user, the commerce server 3 encrypts the designated digital content using a first encryption key (content key to be described later) to generate a program (e.g., a program of Java applet format; this program will be referred to as a content package hereinafter) containing content information. The commerce server 3 also generates a usage right script (to be abbreviated as a URS hereinafter) expressed by a usage right language (e.g., XML) on the basis of the selected use conditions.

Next, the commerce server 3 generates the license control 13 containing content information, second encryption key (user key to be described later), and usage right script. The commerce server 3 also generates a use ticket containing the first encryption key, license control ID, and second encryption key. The license control ID is information to be used to specify the generated license control 13.

The user downloads the content package 11 for the commerce server 3 to the content execution device 4 from which he/she wants to extract the content. The user also downloads the use ticket from the commerce server 3 to the terminal 6 belonging to him/her.

To generate authentication data, the license control 13 is transferred from the commerce server 3 to the usage right control server 5. If the commerce server 3 has a function of generating authentication data, the license control 13 may be held in the commerce server 3.

The user executes the content package on the content execution device 4. Accordingly, the content package 11 communicates with the terminal 6 to read the license control ID in the use ticket 12 and transfer the license control ID to the usage right control server 5.

The usage right control server 5 reads out, from the license control database, a license control specified by the received license control ID. The usage right control server 5 encrypts data obtained by combining the user information, content information, and a random number contained in the readout license control using the second encryption key to generate authentication data. The usage right control server 5 transmits the authentication data to the content execution device 4. The content package decrypts the received authentication data using the second encryption key contained in the use ticket or a third encryption key input by the user and transmits the decrypted data to the usage right control server 5.

The usage right control server 5 checks whether the decrypted data coincides with the data before encryption. If the data coincide with each other, authentication has successfully been done, and the usage right script is transmitted to the content execution device 4. The content package decrypts the content using the first encryption key contained in the use ticket and then executes printing, display, playback, or broadcast in accordance with the use conditions in the usage right script.

Processing executed in this system will be described next in more detail with reference to the flow chart shown in FIG. 2.

Figure 2:
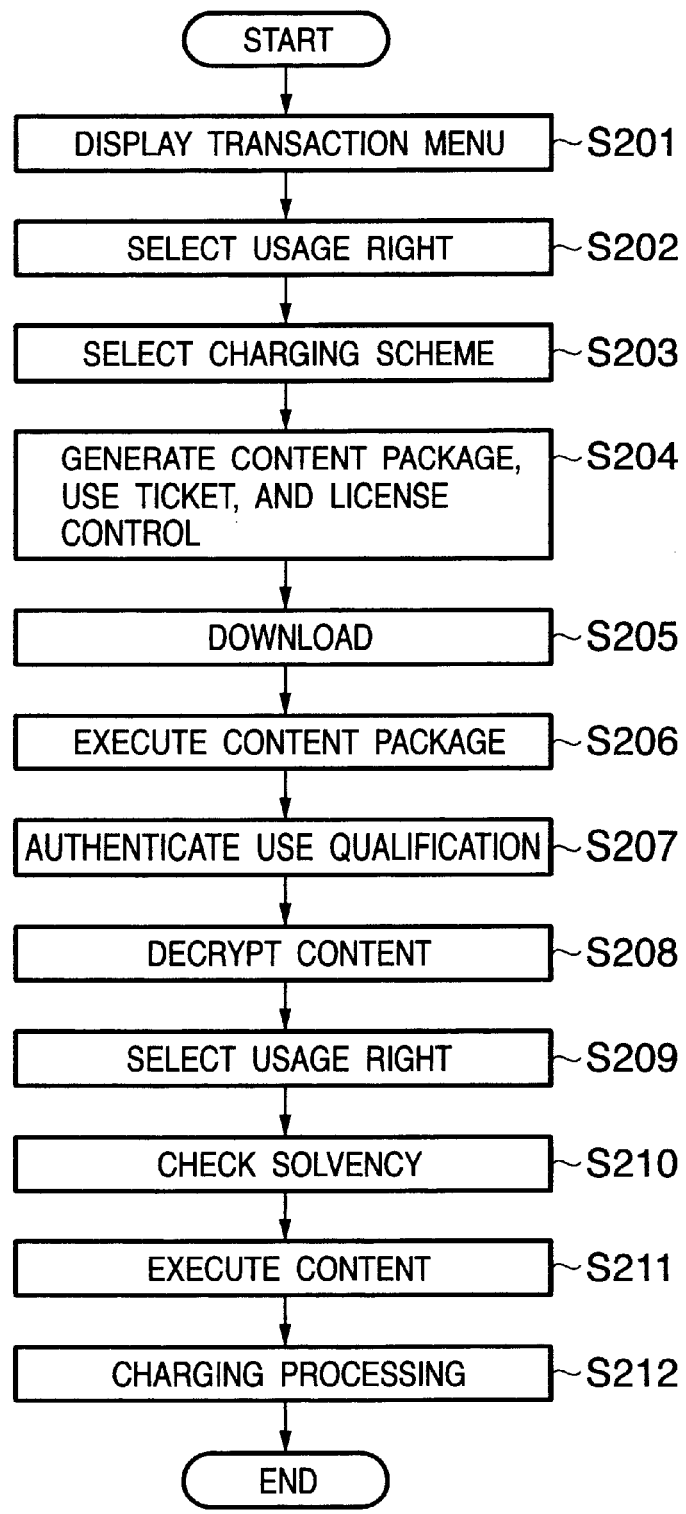
FIG. 2 is a flow chart showing the processing procedure of the first embodiment.

FIG. 2 shows a processing procedure after the user purchases a content until the user is charged for the use of the content. First, the user accesses the commerce server 3 from his/her terminal 2 using a Web browser such as Netscape Navigator (registered trademark) or Internet Explorer (registered trademark) and, if a desired content is present, instructs to purchase the content.

In step S201, the commerce server 3 displays the transaction menu for the content in the Web browser on the display.

FIG. 3 shows a content transaction menu window. A content ID (301), content name (302), available usage rights, and charging method are displayed on the transaction menu window. In the example shown in FIG. 3, only a "print" right (303) is displayed as a usage right. In addition, a "display" right, "copy" right, and the like may be displayed.

In FIG. 3, monochrome printing or color printing can be selected as an option of printing. The amounts displayed in columns 309, 310, 311, and 312 are automatically changed depending on the selection, i.e., monochrome printing or color printing.

Reference numerals 303, 304, 305, 306, and 307 in FIG. 3 denote check boxes. When the user selects the "print" 303, an option "monochrome" or "color" can be selected next. FIG. 3 shows a state wherein "color" is selected.

In step S203 in FIG. 2, the user selects the charging scheme from the result charging scheme and prepaid scheme. This selection is done by checking one of the check boxes 304 and 305. When the result charging scheme is selected, a basic fee for printing is ¥300, and ¥1,200 is added per printing.

When the prepaid scheme is selected, the user can further select (A) a fee for two print processes is to be prepaid or (B) a fee for 10 print processes is to be prepaid. When (A) prepayment for two print processes is selected, a fee of ¥2,000 is necessary for two print processes. When (B) prepayment for 10 print processes is selected, a fee of ¥9,000 must be prepaid for 10 print processes.

When an "other" button 308 is clicked on with the mouse, a prepaid fee selection window (not shown) for another number of print processes except (A) and (B) is displayed, so the user can have another option.

The user also inputs a password (to be referred to as a user key hereinafter) unique to him/her to a text box 313. Reference numeral 314 denotes an OK button; and 315, a cancel button. When the cancel button 315 is clicked on, all pieces of input information are cleared, and a re-input state is set. When the OK button 314 is clicked on, the pieces of information input on the transaction menu are sent to the content commerce server 3. The flow advances to step S204 in FIG. 2.

Note that secure communication using a protocol such as SSL (Secure Sockets Layer) is ensured between the terminal 2 and the content commerce server 3.

Upon receiving the information designated by the user on the transaction menu shown in FIG. 3, the commerce server 3 encrypts the data of the content to generate a content package in step S204.

In encrypting the content data, it is encrypted by a secret key encryption scheme such as DES using an encryption key (to be referred to as a content key). As the content key, a predetermined key may be used. Alternatively, a content key may be generated for each content, each transaction, or each user and used.

The content package also contains content information such as a content ID and content name.

The commerce server 3 also generates a URS described in a language of XML syntax from the use conditions selected by the user on the transaction menu.

Figure 4:
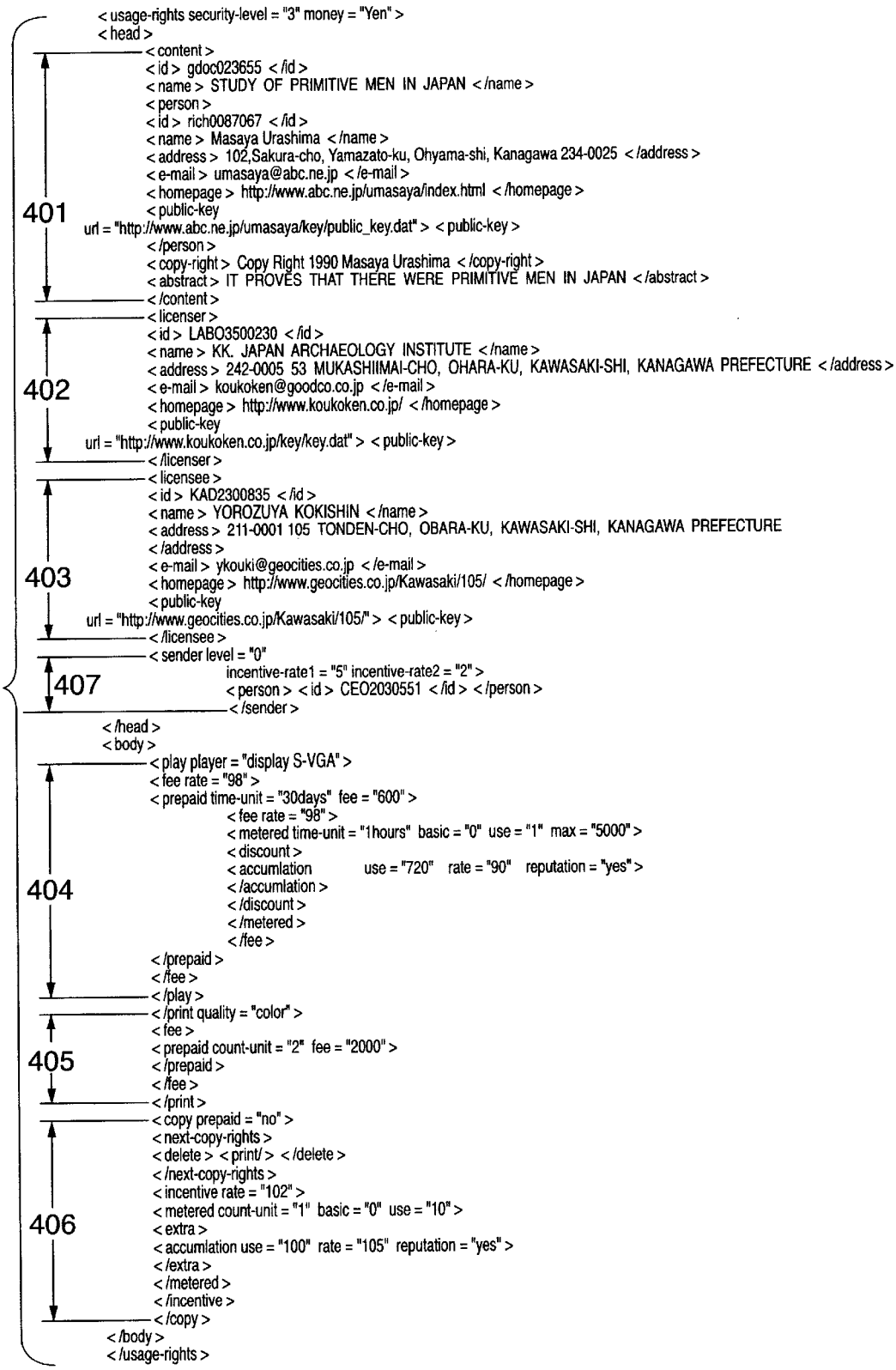
FIG. 4 is a view showing an example of a usage right script.

FIG. 4 shows an example of URS. In the sample of URS shown in FIG. 4, reference numeral 401 denotes content information; 402, licenser information; 403, licensee information; 404, a play (display) right code; 405, a print right code; and 406, a copy right code. According to the description of the print right code 405, color printing should be performed, and the user is charged ¥2,000 for two print processes. The copy right code 406 describes a right to copy and broadcasts the right of the content.

The commerce server 3 generates the license control 13 by combining the URS, the user key input to the text box 313, the content information, and the license control ID and transmits the license control 13 to the usage right control server 5. The license control ID is an ID number uniquely assigned to the license control.

Figure 5:
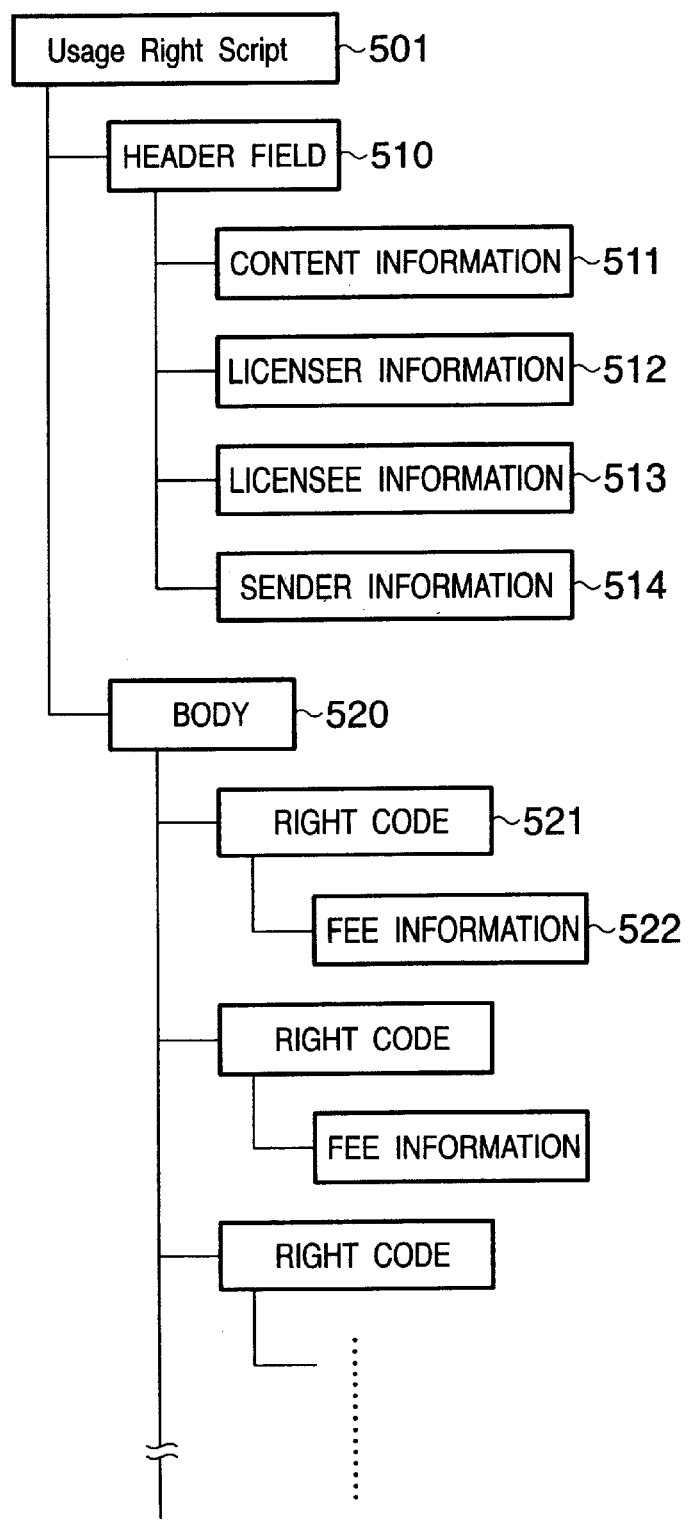
FIG. 5 is a view for explaining the structure of the usage right script.

FIG. 5 shows the structure of the syntax of URS. Reference numerals 501, 510 to 513, and 520 to 522 in FIG. 5 denote text data sandwiched between XML tag delimiters. For example, the content information 511 is sandwiched between content tag delimiters <content> and </content>.

Reference numeral 501 denotes the entire script; and 510, the header field. The header field 510 contains the content information 511, licenser (a person who permits use of the content) information 512, licensee (a person who is permitted to use the content) information 513, and sender information 514.

The body 520 about usage right conditions is described next to the header field 510. The body 520 contains a series of right codes 521. The fee information 522 describes charging information when the right code 521 is used by the user (licensee).

The URS has a hierarchical structure. This means that the described contents of a lower block are sandwiched between the tags of the upper block. Right codes include "play", "print", "copy", "transfer", "loan", and "delete".

"Play" is a right to display or play back a content or play a game. "Print" is a right to print a content. "Copy" is a right to broadcast a copy of a content to a third party. "Transfer" is a right to transfer a content to a third party. "Loan" is a right to temporarily lend a content to a third party. "Delete" is a right to erase a content and get a refund therefor.

In step S204, the use ticket 12 is also generated. The content key, user key, and license control ID are stored in the use ticket 12.

In step S205, the user downloads necessary files. The content package 11 is downloaded to the content execution device 4 connected to the Internet. The use ticket 12 is downloaded to the terminal 6. The license control 13 is transferred to the usage right control server 5 that is under management of the seller (licenser) of the content. If the usage right control server 5 and commerce server 3 constitute a single server, the license control 13 is held in the license control 13.

If the terminal 6 has no Internet connection function, the use ticket 12 is downloaded to the terminal 2 and then transferred from the terminal 2 to the terminal 6 through Bluetooth communication by user operation.

In step S206, the user executes the content package 11 on the content execution device 4. The content package 11 is a Java applet (registered trademark) and can therefore be executed from a Web browser. In step S207, the content package 11 first executes use qualification authentication to check whether the user has legally purchased the content.

Figure 6:
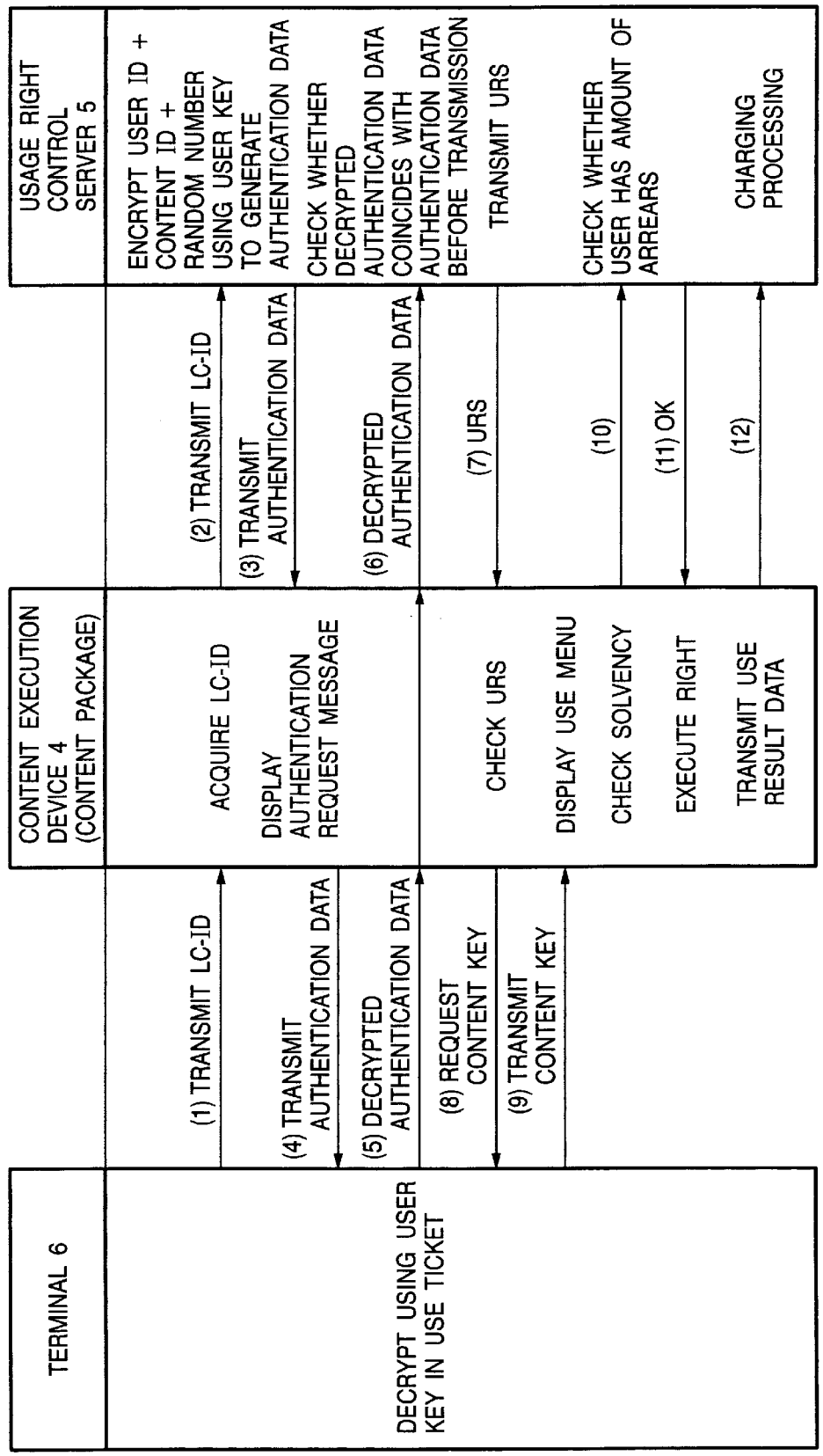
FIG. 6 is a view for explaining the protocol of use qualification authentication.

FIG. 6 shows a detailed protocol of use qualification authentication. The content package 11 waits for a reply from the terminal 6 through a Bluetooth interface incorporated in the content execution device 4. The terminal 6 establishes a communication session with the content execution device 4 through the Bluetooth interface. The terminal 6 transmits, to the content package, the license control ID (LC-ID) in the use ticket 12 stored in the terminal 6 (S601). Next, the content execution device 4 establishes a secure communication session such as SSL with the usage right control server 5.

The content package 11 sends the license control ID to the usage right control server 5 and requests it to search for a license control corresponding to the license control ID (S602). The usage right control server 5 manages, as a database, license controls 13 about licenses purchased by a number of users.

The usage right control server 5 searches for the corresponding license control 13 and generates a random number. The usage right control server 5 encrypts the random number or data obtained by combining the user ID and content ID stored in the license control 13 with the random number using the user key stored in the license control 13 or user's public key corresponding to the user ID, thereby generating authentication data. User's public key can be obtained by searching a key database on the basis of the user ID. Whether the data is to be encrypted by the user key or user's public key is discriminated by security level determined by the license script. This security level is set by the publisher in advance and stored in the usage right script (URS) when the user clicks on the OK button 314 shown in FIG. 3.

Encryption using a designated character sequence as a key is a known technique such as the Crypt program of UNIX (registered trademark) or DES. When encryption is executed by an encryption scheme such as RSA or PGP using the user key as the public key of public key encryption scheme, security can be increased.

The usage right control server 5 sends the authentication data to the content execution device 4 and requests it to decrypt the authentication data (S603). The content package 11 transmits the authentication data to the terminal 6 through the session connected by Bluetooth and requests the terminal 6 to decrypt the authentication data (S604). In response to the decryption request, the terminal 6 decodes the received authentication data using the user key in the use ticket. If the public key encryption scheme is employed to encrypt the authentication data, the authentication data is decrypted using private key data under user's management. This private key is stored and managed in the terminal 6.

The decrypted authentication data is transmitted to the content execution device 4 through the session connected by communication by Bluetooth (S605). The content execution device 4 transmits the received decrypted authentication data to the usage right control server 5 and requests it to check the authentication data (S606). The usage right control server 5 checks whether the authentication data before encryption coincides with the decrypted authentication data sent from the content execution device 4.

If the data do not coincide with each other, it is determined that the user of the content execution device 4 has no proper use qualification. An authentication error is transmitted to the content execution device 4 to end the processing. If the data coincide with each other, it is determined that the user of the content execution device 4 has a use qualification. The URS in the license control 13 is transmitted to the content execution device 4 (S607). With these processes, use qualification authentication is ended. The flow advances to step S208 to decrypt the content.

The content execution device 4 checks by inspecting user information whether the received URS is correct. If no problem is present, the content execution device 4 sends a content key transmission request to the terminal 6 (S608). In response to this transmission request, the terminal 6 transmits the content key stored in the use ticket 12 to the content execution device 4 (S609). The content execution device 4 decrypts the content using the content key received from the terminal 6.

Simultaneously, the content execution device 4 displays a use menu on the display device on the basis of the URS.

Figure 7:
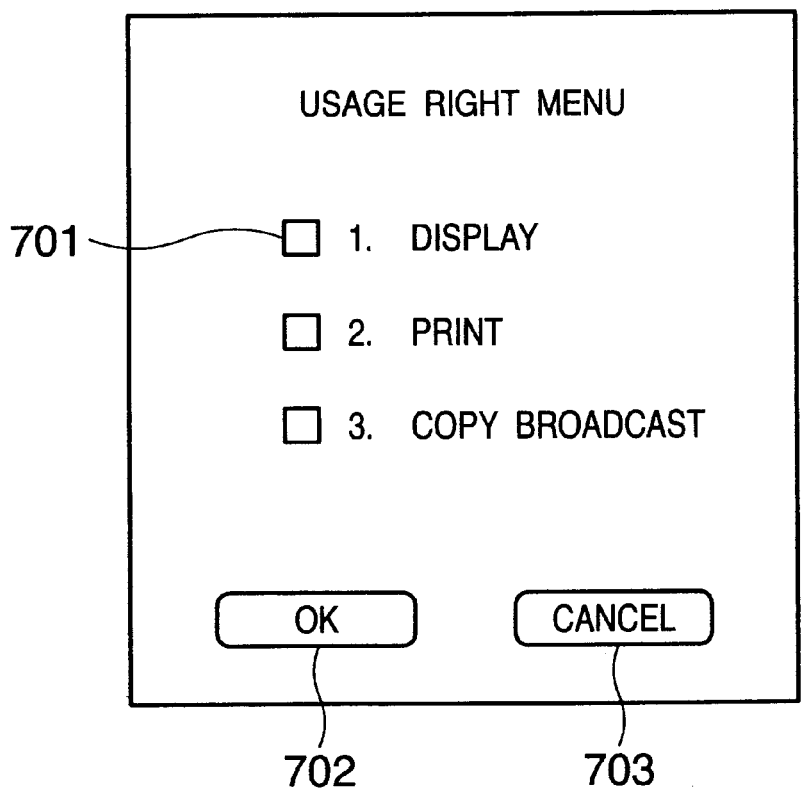
FIG. 7 is a view for explaining an example of a usage right menu.

For example, in the URS shown in FIG. 4, three rights for "play (display)", "print", and "copy" are displayed on the usage right menu. FIG. 7 shows an example of the usage right menu. Referring to FIG. 7, reference numeral 701 denotes a check box to be checked to select a usage right; 702, an OK button to be clicked on to execute the selected usage right; and 703, a cancel button to be clicked on to cancel processing.

When the user selects the right to be executed (S209), the flow advances to step S210 to check the solvency.

<To Print Content>

A case wherein the user selects "print" ("print" in FIG. 7) will be described. Referring to FIG. 4, the prepaid charging scheme for two print processes is selected. Hence, the content package issues a request to the usage right control server 5 to check whether payment has already been done or printing has already been executed twice (S610).

The usage right control server 5 checks these conditions, and if a problem is present, transmits a charging check error to the content execution device 4. Upon receiving the charging check error, the content package ends the processing. At this time, a message representing that a problem of solvency is present may be displayed on the display device.

If no problem is detected by charging check, OK is transmitted (S611). When the content package 11 receives the OK, the flow advances to step S211 to execute the content. In this case, the right to "print" is executed. When execution is normally ended, the flow advances to step S212 to request the usage right control server 5 to execute charging processing (S612). In response to this request, the usage right control server 5 charges the licensee described in the license control an appropriate amount.

The usage right control server 5 has a storage area (credit sales account) for storing a credit sales for each licensee. The charge amount is added to the credit sales account. The licensee is billed the account balance, e.g., at the end of every month.

In this case, since the prepaid charging scheme is selected, the prepaid amount is added to the credit sales when the license control (containing the URS) is generated (S204). In step S212, the remaining usable number of times set upon prepayment is subtracted. When a right with setting of the result charging scheme is executed, the amount of the condition designated in the URS in step S212 is added to the credit sales account.

<To Broadcast Copy of Content to Third Party>

As another example, a case wherein the user selects copy broadcast (3 in FIG. 7) in step S209 will be described next. Copy broadcast means that the user (to be referred to as a broadcast source user hereinafter) broadcasts a copy of a content to a third party (to be referred to as a broadcast destination user hereinafter). The contents of a copy right for which the broadcast source user has a license are shown in the usage right script 406 shown in FIG. 4. Here, prepaid= "no" means the broadcast destination user is charged for use of a content, and prepaid="yes" means that the broadcast source user prepays the content use fee (except a fee in the result charging scheme).

A description sandwiched between next-copy-rights tags means that the copy right is deleted at the broadcast destination. That is, the broadcast destination user has no copy right.

A description sandwiched between incentive tags designates the amount of incentive (incentive for copy broadcast) to be paid to the broadcast source user. In this case, every time the broadcast source user broadcasts one copy, ¥10 (designated by use="10") is paid from the licenser of the content to him/her.

However, "rate="102" means a premium of 2% because the broadcast source user has contributed for use or broadcast of the content in the past. More specifically, when copy broadcast is executed 20 times, 10★20★102%=¥202 is obtained as an incentive for copy broadcast.

A description sandwiched between extra tags defines the rate of premium when the number of times of copy broadcast increases. In this case, when the number of times of copy broadcast reaches 100 times (designated by use="100" in accumulation tag), 105% of the defined amount is paid as an incentive.

More specifically, when copy broadcast is executed 100 times, 10★100★105%★102%=¥1,071 is obtained as an incentive. In addition, "reputation="yes" in the accumulation tag designates that the same rate of premium (105%) is applied even when copy broadcast is executed 100 or more times. For example, when copy broadcast is executed 300 times, 10★300★105%★102%=¥3,213 is obtained as an incentive.

Figure 9:
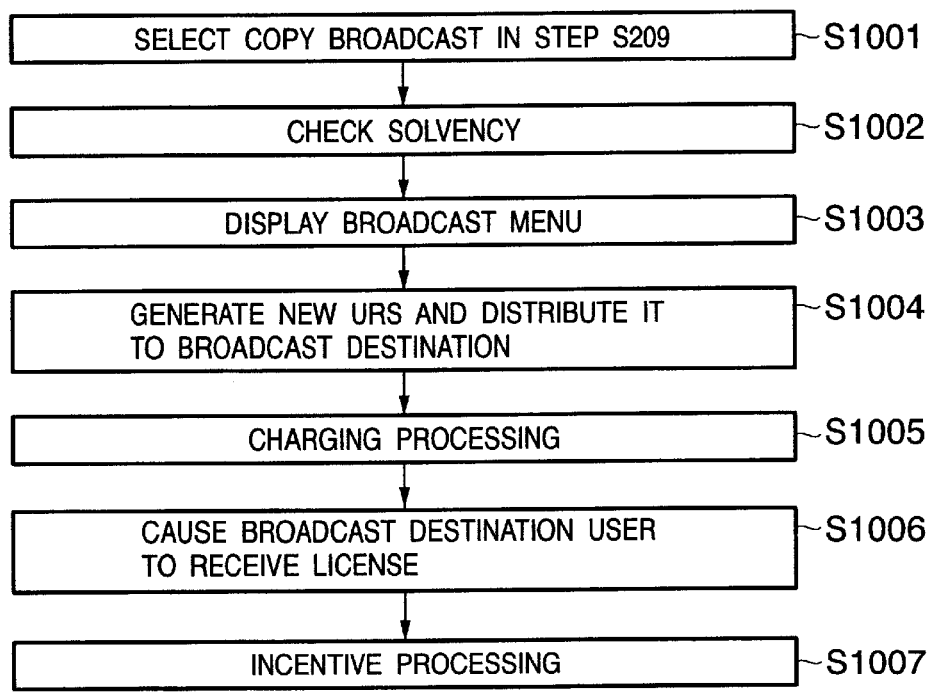
FIG. 9 is a flow chart showing an example of a broadcast procedure.

FIG. 9 is a flow chart showing a processing procedure that replaces steps S209 to S212 when copy broadcast is selected in step S209.

When the broadcast source user selects copy broadcast in FIG. 7 in step S209 (step S1001), the solvency is checked in step S1002. More specifically, it is checked whether the amount of arrears of the broadcast source user exceeds a predetermined limit. The usage right control server 5 refers to a delinquency point storage area 1212 shown in FIG. 11.

Figure 8:
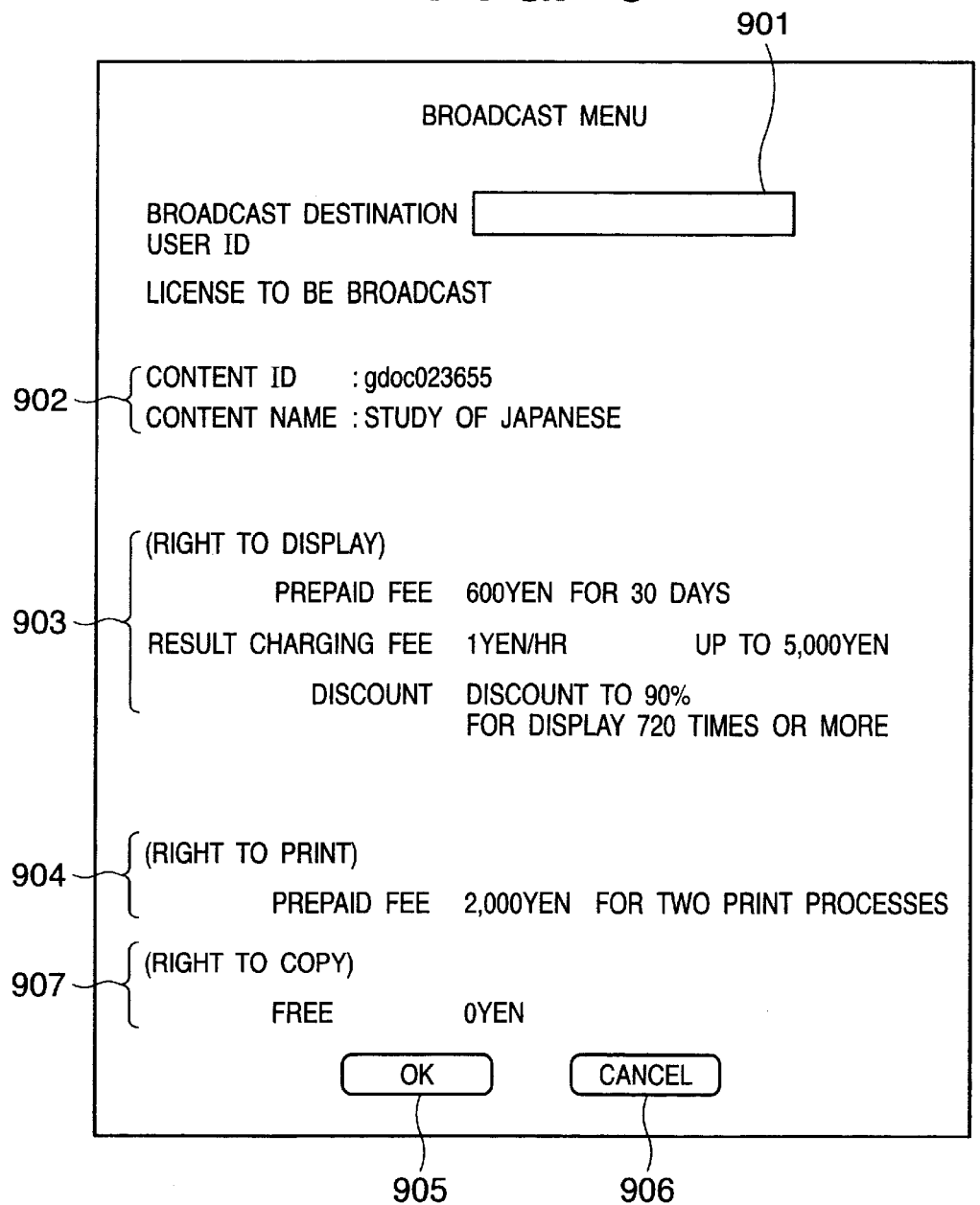
FIG. 8 is a view for explaining an example of a broadcast menu.

The usage right control server 5 displays a broadcast menu shown in FIG. 8 on the display device of the content execution device (step S1003). The broadcast source user inputs a broadcast destination user ID to a box 901 in FIG. 8. Reference numeral 902 denotes information of a content to be broadcast; and 903, 904, and 907, license rights to be broadcast and charging methods for execution of the rights.

As the fees of rights, prepaid fees are displayed. These fees are paid by the broadcast destination user. If the copy tag 406 designates prepaid="yes", these fees are paid by the broadcast source user who broadcasts the content.

An OK button 905 is clicked on to execute broadcast, and a button 906 is clicked on to cancel broadcast. When the broadcast source user clicks on the OK button, a URS for copy broadcast is newly generated (S1004). The broadcast URS is obtained by changing the URS shown in FIG. 4 in the following way.

(A) the licensee information 403 is replaced with that of the broadcast destination user. The licensee information requires a name, address, and the like, which are not input in the broadcast menu shown in FIG. 8. These pieces of information may be extracted from the user database managed by the usage right control server 5 by using the user ID as a key. Alternatively, information except the user ID may be omissible in the URS.

In addition, (B) the sender information 407 is replaced with the following information.

<sender level="1"incentive-rate1="5"incentive-rate2="2">

<person><id>KAD2300835<id></person></sender>

The level value is a number that represents the hierarchy number of the broadcast source user who broadcasts the URS, i.e., the license receiver viewed from the licenser of the content. The level value is 0, which means that the person (= licenser) who transmits the URS shown in FIG. 4 is the first broadcast source.

If the broadcast destination user who has received the URS can further broadcast a copy of the content, the level value of the user who has received the content from the broadcast destination user is incremented by one to 2. Every time broadcast is executed for a child, grandchild, and so on, the level value is incremented by one in every broadcast. However, in the URS shown in FIG. 4, since the copy right is deleted as is defined by the next-copy-rights tag, re-broadcast is inhibited.

On the other hand, if the broadcast destination user takes over the copy right, re-broadcast can be executed.

The licensee of the URS shown in FIG. 4 will be called a first user. The broadcast destination user to which the URS shown in FIG. 4 is broadcast will be called a second user. A user to which the URS is broadcast from the second user will be called a third user. Generally, the URS can be broadcast up to a user n.

In the sender tag 407, incentive-rate1="5" means that 5% of the content use fee of the user of level 2 (i.e., second user) is paid to the user of level 1 (i.e., first user) as an incentive. Additionally, incentive-rate2="2" means that 2% of the incentive that the second user receives from the third user is paid to the first user.

In a similar manner, the user n receives 5% of the content use fee of a user (n+1) as an incentive and also receives 2% of the incentive that the user (n+1) receives from a user (n+2). Hence, the first user can receive part of the use fee of the end user to which the content is broadcast.

The new URS obtained by doing the changes (A) and (B) for the URS shown in FIG. 4 is transmitted to the broadcast destination user (step S1004). The usage right control server 5 manages, in its storage device, license control information of each member of the content broadcast system and information of license (to be referred to as an unreceived license) that is broadcast from a member to another member but is not received yet in the data structure as shown in FIG. 5.

Figure 10:
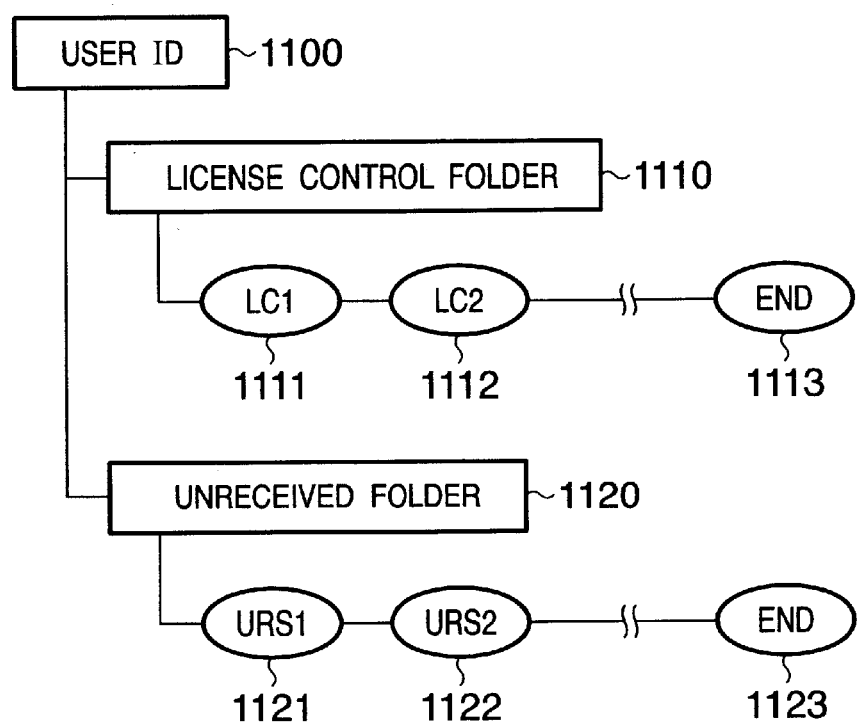
FIG. 10 is a view for explaining a data structure representing license management information about one user.

FIG. 10 shows a data structure representing license management information (license control ID and unreceived license information) about one user. A folder 1100 corresponds to a user ID (in, e.g., Windows (registered trademark) file system, the user ID is used as the folder name). A license control folder 1110 and unreceived folder 1120 belong to the folder 1100.

License control files 1111 and 1112 belong to the license control folder 1110. A license control ID is recorded in each file. The usage right control server 5 separately has a license control database. A license control ID indicates the position of a license control in the database. The license control files have a linear list structure. An END file 1113 is placed at the end.

A linear list of URS information files in which broadcast URS (usage right script) is recorded belongs to the unreceived folder 1120. An END file 1123 is placed at the end.

The newly transmitted URS is added to the end of the list of the unreceived folder 1120 shown in FIG. 10.

In step S1005, charging processing is executed for content copy broadcast by the broadcast source user. In the example shown in FIG. 4, since prepaid="no" is designated by the copy tag, the charge is 0.

However, when prepaid="yes" is designated, the prepaid fee for the display right and print right is processed as the charge for the user. The usage right control server 5 has a charge database which is to be used to process the charges and incentives for all users of the system.

Figure 11:
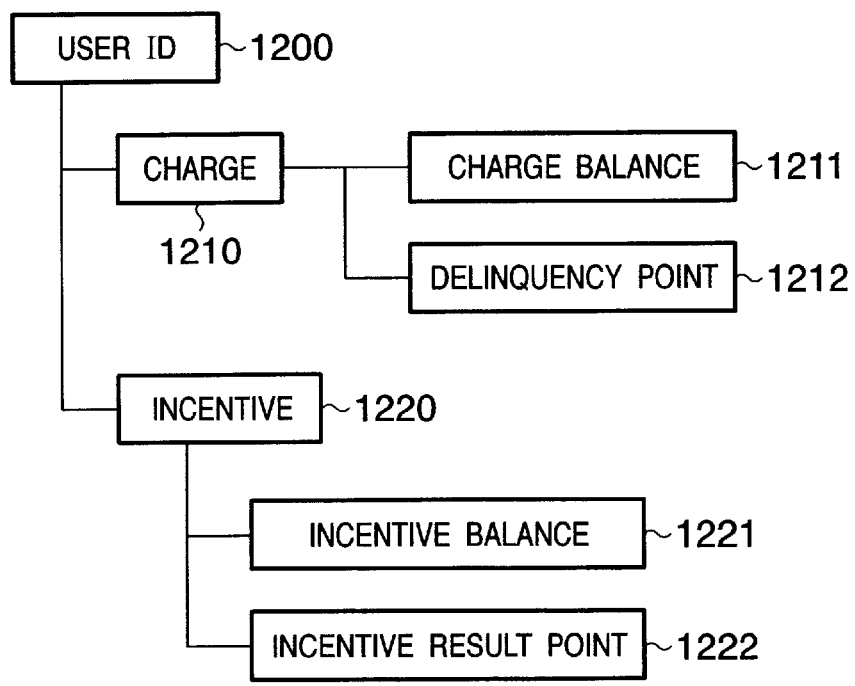
FIG. 11 is a view for explaining an example of a method of managing charging and incentive for each user.

FIG. 11 shows the data structure of the charge database. Reference numeral 1200 denotes a folder having a user ID as a name. A charge folder 1210 and incentive folder 1220 belong to the folder 1200. A file 1211 which records the charge balance and a file 1212 which records the delinquency point belong to the charge folder 1210. A file 1221 which records the incentive balance and a file 1222 which records the incentive result point belong to the incentive folder 1220.

In the charge balance recording file 1211, a charge amount accumulated after the preceding settlement processing is recorded. The amount becomes 0 when the charge amount at the next settlement time is withdrawn from the bank account of the user. If settlement cannot be done at the time of settlement, points are added to the delinquency point file 1212 in accordance with the charge balance.

For example, one point is added for every ¥1,000. In the incentive balance file 1221, an incentive which is accumulated after the preceding settlement time and should be paid to the user is added and stored. At the time of settlement, the incentive balance stored in the incentive balance file 1221 is remitted to user's bank account. In the incentive result point file 1222, points are added and stored in accordance with the amount of paid incentive and the charge amount for the user. For example, one point is added for every ¥1,000.

The incentive result point file 1222 is used to determine the rate value of the incentive tag when a URS is generated in the usage right control server 5. The delinquency point 1212 is used to check the solvency in step S210. If the delinquency point exceeds a predetermined value, the user is regarded insolvent.

Such a user ID folder is prepared for each user in the charge database.

When the license is broadcast, and the new URS file is added to the unreceived folder 1120 in step S1004, e-mail is sent to the broadcast destination user to notify him/her that "the license is broadcast". The broadcast destination user accesses the usage right control server 5 from his/her terminal 2 to perform license reception processing (step S1006).

More specifically, almost the same menu window as that shown in FIG. 3 is presented for the broadcast destination user. In this case, however, the items 303 to 308 are not displayed, so no usage right can be selected. When the broadcast destination user inputs the password (user key for authentication) to the text box 313 and clicks on the OK button, the license is received.

Then, the usage right control server 5 extracts a content key to be used to decrypt the content from the content database on the basis of the content information in the URS and generates a license control from the content information (contained in the URS), the user key (password), and the URS (URS that is broadcast).

The usage right control server 5 also assigns a license control ID which uniquely designates the license control and generates a use ticket containing the content key, user key, and license control ID. The assigned license control ID is added to the license control folder 1110 as a file. The received URS is deleted from the unreceived folder 1120.

The license control is stored in the license control database of the usage right control server 5. A page where the content package 11 and use ticket are to be downloaded is displayed. The broadcast destination user downloads the content package 11 and use ticket 12 from the page to the user terminal 2 or user terminal 6.

The content database which manages content information, content keys, and content packages in correspondence with each other is present in the commerce server 3. When the broadcast destination user receives the license in step S1006, an incentive is added to the incentive balance 1221 of the broadcast source user (S1007).

As described above, according to this embodiment, the use qualification can be authenticated while secretly protecting user's private key information without storing the key information in the content execution device, i.e., the server that provides the service. Hence, the service providing side can control such that only an authentic user who has paid a fee can use the copyright of a content or a service usage right. In addition, the user can prevent any third party from illicitly using a right that the user has purchased.

(Second Embodiment)

The second embodiment of the present invention will be described next.

In the first embodiment, authentication data encrypted by the usage right control server is decrypted by the user terminal, and it is checked whether the decrypted authentication data coincides with authentication data before encryption. However, the present invention is not limited to this. In the second embodiment, a usage right control server directly transmits authentication data (or a simple random number) to a user terminal. The user terminal encrypts the authentication data. The usage right control server decrypts the encrypted authentication data and checks whether the decrypted authentication data coincides with the transmitted authentication data. In this case, the user terminal receives the authentication data from the usage right control server and encrypts the authentication data using a second encryption key contained in a use ticket or a third encryption key (private key) stored in a terminal 6, thereby generating authentication data. When a content package transmits the authentication data to the usage right control server, the usage right control server decrypts the authentication data using an encryption key contained in a license control and checks whether the decrypted data coincides with the transmitted authentication data, thereby executing authentication.

The flow from license purchase to license execution in this embodiment is the same as in FIG. 2. In the first embodiment, use qualification authentication in step S207 is performed in accordance with FIG. 6. In the second embodiment, however, the use qualification authentication is done in accordance with FIG. 12. The remaining arrangements and operations are the same as those of the first embodiment. The same reference numerals as in the first embodiment denote the same parts, and a description thereof will be omitted.

Steps of use qualification authentication done in this case will be described below.

FIG. 12 shows a detailed protocol of use qualification authentication. The content package waits for a reply from the terminal 6 through a Bluetooth interface incorporated in a content execution device 4. The terminal 6 establishes a communication session with the content execution device 4 through the Bluetooth interface. The terminal 6 transmits, to the content package, a license control ID in the use ticket stored in the terminal 6 (S1201). The content package establishes a secure communication session such as SSL with a usage right control server 5.

The content package sends the license control ID to the usage right control server 5 and requests it to search for a license control corresponding to the use ticket (S1202). The usage right control server (usage right control server 5) manages, as a database, license controls about licenses purchased by a number of users.

The usage right control server 5 searches for a corresponding license control and generates a random number. Data obtained by combining the user ID and content ID stored in the license control with the random number is defined as first authentication data, or the random number itself may be defined as the first authentication data instead.

The usage right control server 5 sends the first authentication data to the content execution device 4 to request it to convert the first authentication data into signature data (S1203). The content package transmits, to the terminal 6, the first authentication data through the session connected by communication by Bluetooth to request signature data (S1204). In response to this signature data request, the terminal 6 converts the received first authentication data into signature data using user's private key stored and managed in the terminal 6, thereby preparing second authentication data.

The second authentication data is transmitted to the content execution device 4 through the session connected by communication by Bluetooth (S1205).

The content execution device 4 transmits the received second authentication data to the usage right control server 5 and requests it to check the authentication data (S1206).

The usage right control server 5 decrypts the second authentication data using user's public key to obtain third authentication data. The usage right control server 5 checks whether the authentication data before encryption coincides with the third authentication data.

If the data do not coincide with each other, it is determined that the user of the content execution device 4 has no proper use qualification. An authentication error is transmitted to the content execution device 4 to end the processing. If the data coincide with each other, it is determined that the user of the content execution device 4 has a use qualification. The URS in a license control 13 is transmitted to the content execution device 4 (S1207).

The content execution device 4 checks by inspecting user information whether the received URS is correct. If no problem is present, the user menu shown in FIG. 7 is displayed on the display device of the content execution device 4 on the basis of the URS. In addition, the content execution device 4 sends a content key transmission request to the terminal 6 (S1208). In response to this transmission request, the terminal 6 transmits the content key stored in the use ticket to the content execution device 4 (S1209). The content is decrypted by the content key.

When the user selects the right to be executed in FIG. 7, a content package 11 sends a solvency check request to the usage right control server 5 (S1210).

The usage right control server 5 checks the conditions, and if a problem is present, transmits a charging check error to the content execution device 4. Upon receiving the charging check error, the content package 11 ends the processing. If no problem is detected by charging check, OK is transmitted (S1211).

When the content package 11 receives the OK, the content is executed. When execution terminates normally, the usage right control server 5 is requested to execute charging processing (S1212). The usage right control server 5 charges an appropriate amount to the licensee described in the license control.

Processing in (S1204) to (S1206) shown in FIG. 12 is not limited to the above-described processing, and any other encryption method may be used. For example, the terminal 6 that has received the first authentication data from the content execution device 4 may generate first hash data from the first authentication data using a predetermined directional hash function (e.g., SHA1). In this case, the first hash data is encrypted using user's private key stored and managed in the terminal 6 and transmitted to the content execution device 4 as second authentication data. On the other hand, the usage right control server 5 receives the second authentication data through the content execution device 4 and decrypts the second authentication data using user's public key to obtain the first hash data. Second hash data is generated from the first authentication data using the directional function. The decrypted first hash data is compared with the generated second hash data to check whether they coincide with each other.

Not the public key scheme but a secret key encryption scheme may be used for encryption such that the usage right control server 5 secretly manages a secret key for the terminal 6 and decrypts authentication data.

(Supplementary Explanation for Signature Data Generation)

A supplementary explanation about signature data generation will be done below.

As described in Shigeo Tsujii & Masao Kasahara, "Cryptography and Information Security", pp. 62–65, SHOKODO CO., LTD (1990), in the RSA encryption scheme, arbitrary data can be converted into encrypted data using a public key, and the encrypted data can be decrypted using a private key corresponding to the public key. In addition, arbitrary data can be converted into signature data using a private key, and the signature data can be restored to the original data using a public key corresponding to the private key. The latter technique is normally used for digital signature. Since the processing of converting data into signature data corresponds to encryption, the signature data generation is incorporated in the concept of encryption in this specification.

In this specification, "encryption" includes encryption using a public key, encryption using a private key, encryption using a secret key, encryption such as scrambling without using any key, and hash data generation.

(Other Embodiment)

The embodiments of the present invention have been described above. The present invention can be applied to a system constituted by a plurality of devices, or to an apparatus comprising a single device.

The present invention is also achieved even by supplying a software program (in the embodiments, a program corresponding to the flow charts shown in FIGS. 2 and 10) which implements the functions of the above-described embodiments to the system or apparatus directly or from a remote site and causing the computer of the system or apparatus to read out and execute the supplied program code. The form need not always be a program as long as the functions of the program can be obtained.

Hence, to implement the functional processing of the present invention by a computer, the program code itself, which is installed in the computer, also implements the present invention. That is, a computer program itself, which implements the functional processing of the present invention, is also incorporated in the claim of the present invention.

In this case, the program can take any form such as an object code, a program to be executed by an interpreter, or script data to be supplied to the OS as long as the functions of the program can be obtained.

As a recording medium for supplying the program, for example, a floppy (registered trademark) disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

According to the present invention, service providing method with high security, information processing system, control program, and storage medium can be provided.

The present application claims priority from Japanese Patent Application No. 2002-121020, which is incorporated herein by reference.

As many apparently widely different embodiments of the present invention can be made without departing from the spirit and scope thereof, it is to be understood that the invention is not limited to the specific embodiments thereof except as defined in the appended claims.

What is claimed is:

1. A service providing method which uses a user terminal which stores a decryption key, a service providing apparatus which can communicate with the user terminal, and an authentication apparatus which can communicate with the service providing apparatus, comprising:

an authentication data generation step of generating authentication data and encrypting the generated authentication data using an encryption key;

a first transmission step of transmitting the encrypted authentication data from the authentication apparatus to the user terminal through the service providing apparatus;

a decryption step of decrypting the encrypted authentication data in the user terminal using the decryption key stored in the user terminal;

a return step of returning the authentication data decrypted in said decryption step to the authentication apparatus through the service providing apparatus;

an authentication step of authenticating the decrypted authentication data in the authentication apparatus by comparing the decrypted authentication data transmitted from the user terminal and returned in said return step with the authentication data generated in said authentication data generation step before encryption;

a second transmission step of transmitting usage right information, which prescribes a use condition of a service, from the authentication apparatus to the service providing apparatus if the authentication step authenticates the decrypted authentication data; and a service providing step of causing the service providing apparatus to provide the service to the user in accordance with the condition prescribed in the usage right information.

2. The method according to claim 1, wherein in said authentication data generation step, the authentication data is generated using user specifying information which specifies a user.

3. The method according to claim 2, wherein in said authentication data generation step, the authentication data is generated also using service specifying information that specifies the service to be provided.

4. The method according to claim 2, further comprising, before said authentication data generation step, a specifying information transmission step of transmitting information that specifies the user specifying information from the user terminal to the authentication apparatus through the service providing apparatus.

5. The method according to claim 2, wherein said authentication data generation step includes a random number generation step of generating a random number in the authentication apparatus, and the authentication data is generated using the user specifying information and the generated random number.

6. The method according to claim 1, wherein the encryption key used in said authentication data generation step is a public key corresponding to the user, and the decryption key used in said decryption step is a private key unique to the user.

7. The method according to claim 1, wherein the user terminal is a portable information terminal.

8. A service providing method which uses a user terminal which stores an encryption key, a service providing apparatus which can communicate with the user terminal, and an authentication apparatus which can communicate with the service providing apparatus, said method comprising:

an authentication data generation step of generating authentication data;

a first transmission step of transmitting the authentication data from the authentication apparatus to the user terminal through the service providing apparatus;

an encryption step of encrypting the authentication data in the user terminal using the encryption key stored in the user terminal;

a return step of returning the authentication data encrypted in said encryption step to the authentication apparatus through the service providing apparatus;

an authentication step of authenticating the returned authentication data returned in said return step in the authentication apparatus by decrypting the encrypted authentication data transmitted from the user terminal and returned to the authentication apparatus in said return step using a decryption key stored in the authentication apparatus and comparing the decrypted authentication data with the authentication data transmitted in said first transmission step;

a second transmission step of transmitting usage right information which prescribes a use condition of a service from the authentication apparatus to the service providing apparatus if the authentication step authenticates the returned authentication data returned to the authentication apparatus in said return step; and a service providing step of causing the service providing apparatus to provide the service to the user in accordance with the use condition prescribed in the usage right information.

9. The method according to claim 8, wherein in said encryption step, the authentication data is converted into hash data and then encrypted, and said authentication step, decrypts the encrypted authentication data by using the decryption key to produce decrypted hash data and authenticates the decrypted authentication data by comparing the decrypted hash data decrypted using the decryption key with the hash data generated from the authentication data transmitted in said first transmission step.

10. The method according to claim 8, wherein the encryption key used in said encryption step is a private key unique to the user, and the decryption key used in the authentication step is a public key corresponding to the user.

11. The method according to claim 8, wherein in the authentication data generation step, the authentication data is generated using user specifying information which specifies a user.

12. The method according to claim 11, further comprising, before said authentication data generation step, a specifying information transmission step of transmitting information that specifies the user specifying information from the user terminal to the authentication apparatus through the service providing apparatus.

13. The method according to claim 11, wherein said authentication data generation step includes a random number generation step of generating a random number in the authentication apparatus, and the authentication data is generated using the user specifying information and the generated random number.

14. The method according to claim 8, wherein the user terminal is a portable information terminal.

15. An information processing system comprising:

a user terminal configured to store a decryption key;

a service providing apparatus configured to communicate with said user terminal; and an authentication apparatus configured to communicate with said service providing apparatus, wherein said authentication apparatus comprises;
authentication data generation means for generating authentication data and encrypting the generated authentication data; and
first transmission means for transmitting the encrypted authentication data from said authentication apparatus to said user terminal through said service providing apparatus, wherein said user terminal comprises:
storage means for storing the decryption key;
decryption means for decrypting the encrypted authentication data using the decryption key stored in said storage means; and
return means for returning the authentication data decrypted by said decryption means to said authentication apparatus through said service providing apparatus, wherein said authentication apparatus comprises:
authentication means for authenticating the decrypted authentication data by comparing the decrypted authentication data returned from said user terminal by said return means with the authentication data generated by said authentication data generation means before said authentication data generation means encrypted the authentication data; and
second transmission means for transmitting usage right information which prescribes a use condition of a service to the service providing apparatus if said authentication means authenticates the decrypted authentication data; and wherein said service providing apparatus provides the service to the user in accordance with the use condition prescribed in the usage right information.

16. An information processing system comprising:

a user terminal configured to store an encryption key;

a service providing apparatus configured to communicate with said user terminal; and an authentication apparatus configured to communicate with said service providing apparatus, wherein said authentication apparatus comprises:
authentication data generation means for generating authentication data;
and
first transmission means for transmitting the authentication data from said authentication apparatus to said user terminal through said service providing apparatus, wherein said user terminal comprises:
storage means for storing the encryption key;
encryption means for encrypting the authentication data using the encryption key stored in said user terminal; and
return means for returning the authentication data encrypted by said encryption means to said authentication apparatus through said service providing apparatus, wherein said authentication apparatus comprises:
storage means for storing a decryption key;
authentication means for authenticating the encrypted authentication data by decrypting the encrypted authentication data returned from said user terminal by said return means using the decryption key stored in said authentication apparatus and comparing the decrypted authentication data with the authentication data transmitted by said first transmission means;
second transmission means for transmitting usage right information which prescribes a use condition of a service to the service providing apparatus if the authentication means authenticates the encrypted authentication data, and wherein said service providing apparatus provides the service to the user in accordance with the use condition prescribed in the usage right information.

17. An authentication apparatus which can communicate with a user terminal through a service providing apparatus, comprising:

authentication data generation means for generating authentication data and encrypting the generated authentication data using an encryption key corresponding to the user;

first transmission means for transmitting the encrypted authentication data to the user terminal through the service providing apparatus;

reception means for receiving, through the service providing apparatus, authentication data obtained by decrypting the encrypted authentication data in the user terminal using a decryption key stored in the user terminal;

authentication means for authenticating the decrypted authentication data by comparing the decrypted authentication data received by said reception means with the authentication data generated by said authentication data generation means before encryption; and second transmission means for transmitting usage right information which prescribes a use condition of a service to the service providing apparatus if said authentication means authenticates the decrypted authentication data.

18. An authentication apparatus which can communicate with a user terminal through a service providing apparatus, comprising:

authentication data generation means for generating authentication data;

first transmission means for transmitting the generated authentication data from said authentication apparatus to the user terminal through the service providing apparatus;

reception means for receiving, through the service providing apparatus, authentication data obtained by encrypting the authentication data in the user terminal using an encryption key stored in the user terminal;

decryption means for decrypting the encrypted authentication data received by said reception means using a decryption key corresponding to the user;

authentication means for authenticating the decrypted authentication data by comparing the decrypted authentication data with the authentication data transmitted by said first transmission means;

second transmission means for transmitting usage right information which prescribes a use condition of a service to the service providing apparatus if said authentication means authenticates the decrypted authentication data.

19. A control program for a computer which functions as an authentication apparatus which can communicated with a user terminal through a service providing apparatus, the control program causing the computer to execute:

an authentication data generation step of generating authentication data and encrypting the generated authentication data using an encryption key corresponding to the user;

a first transmission step of transmitting the encrypted authentication data to the user terminal through the service providing apparatus;

a reception step of receiving, through the service providing apparatus, authentication data obtained by decrypting the encrypted authentication data in the user terminal using a decryption key stored in the user terminal;

an authentication step of authenticating the decrypted authentication data by comparing the decrypted authentication data received in said reception step with the authentication data generated in said authentication data generation step before encryption;

a second transmission step of transmitting usage right information which prescribes a use condition of a service to the service providing apparatus if said authentication step authenticates the decrypted authentication data.

20. A control program for a computer which functions as an authentication apparatus which can communicate with a user terminal through a service providing apparatus, the control program causing the computer to execute:

an authentication data generation step of generating authentication data;

a first transmission step of transmitting the generated authentication data from the authentication apparatus to the user terminal through the service providing apparatus;

a reception step of receiving, through the service providing apparatus, authentication data obtained by encrypting the authentication data in the user terminal using an encryption key stored in the user terminal;

a decryption step of decrypting the encrypted authentication data received in said reception step using a decryption key corresponding to the user;

an authentication step of authenticating the decrypted authentication data by comparing the decrypted authentication data with the authentication data transmitted in the first transmission step; and a second transmission step of transmitting usage right information which prescribes a use condition of a service to the service providing apparatus if said authentication step authenticates the decrypted authentication data.

* * * * *

UNITED STATES PATENT AND TRADEMARK OFFICE
CERTIFICATE OF CORRECTION

PATENT NO. : 6,799,271 B2
DATED : September 28, 2004
INVENTOR(S) : Masami Kugai

It is certified that error appears in the above-identified patent and that said Letters Patent is hereby corrected as shown below:

Drawings,
Sheet 4, Fig. 4, "<accumlation" should read -- <accumulation -- (2 occurrences).
Sheet 4, Fig. 4, "</accumlation>" should read -- </accumulation> --.

Column 1,
Line 52, "accordance" should read -- accordance with --.

Column 3,
Line 25, "communicate" should read -- communication --.
Line 47, ""640★480" should read -- 640×480 --.

Column 5,
Line 25, "may the" should read -- may be --

Column 8,
Line 52, "a" should be deleted.

Column 9,
Line 23, "10★20★102%" should read -- 10×20×102% --.
Line 32, "10★100★105%★102%" should read -- 10×100×105%×102% --.
Line 37, "10★300★105%★102%" should read -- 10×300×105%×102% --.

Column 19,
Line 47, "communicated" should read -- communicate --.

Signed and Sealed this

Twenty-sixth Day of April, 2005

JON W. DUDAS
*Director of the United States Patent and Trademark Office*